Oct. 29, 1968     S. M. LEE     3,408,133
KERR-CELL CAMERA SHUTTER
Filed Jan. 23, 1964
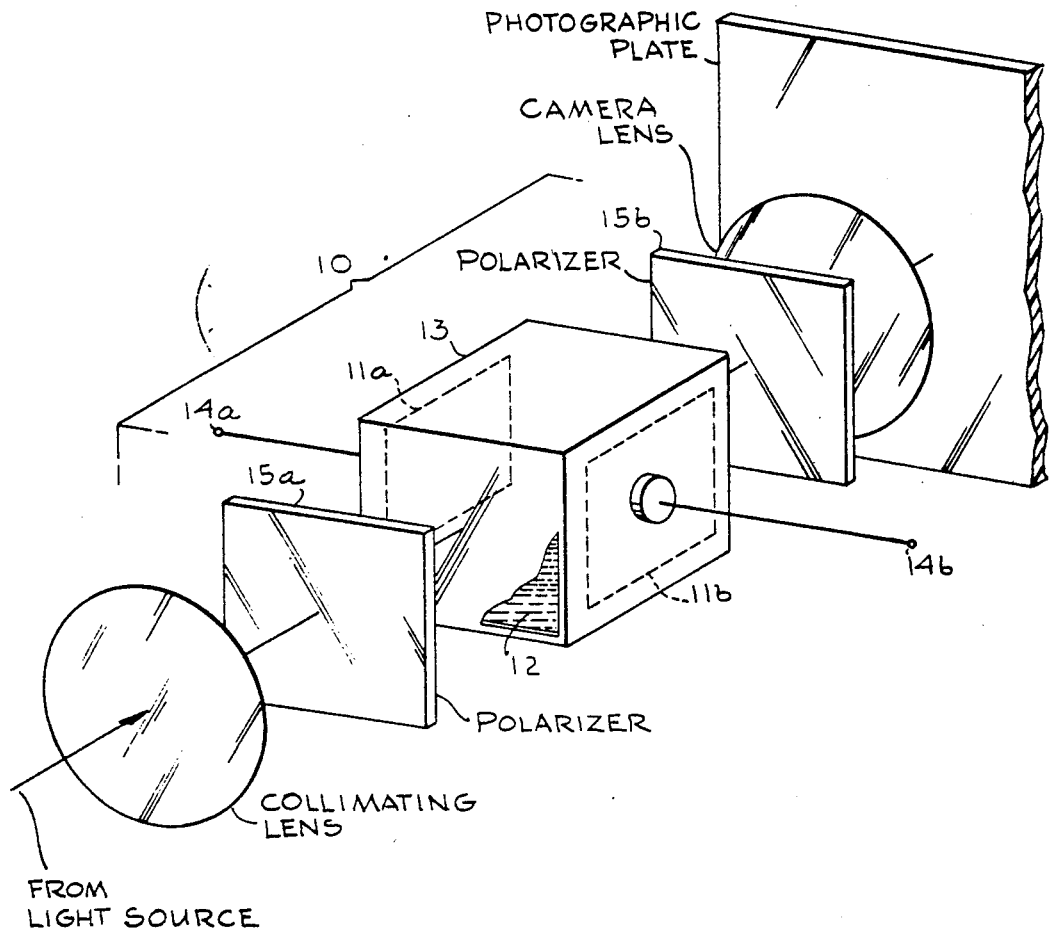
STUART M. LEE
INVENTOR.
BY
ATTORNEY

United States Patent Office 3,408,133
Patented Oct. 29, 1968

3,408,133
KERR-CELL CAMERA SHUTTER
Stuart M. Lee, Glendora, Calif., assignor to Electro-Optical Systems, Inc., Pasadena, Calif.
Filed Jan. 23, 1964, Ser. No. 339,820
5 Claims. (Cl. 350—150)

ABSTRACT OF THE DISCLOSURE

A Kerr-cell camera shutter having as its birefringent material an organic compound containing a nitrile group such as 4-biphenyl carbonitrile and cyanoguanidine or a nitro group with another nitro group or a methyl group such as 2,4-dinitrotoluene, meta-dinitrobenzene, and meta-nitrotoluene.

---

The present invention relates to Kerr-cell camera shutters in general and more particularly relates to apparatus of the kind mentioned that employs a new type of birefringent fluid.

The ordinary Kerr cell is composed of two flat plates or electrodes immersed in a fluid which becomes birefringent upon the application of an electric field. When such a cell is oriented between two polarizers crossed for minimum transmission, the arrangement constitutes an optical shutter. With no voltage applied, light cannot be transmitted because of the crossed polarizers. However, a voltage applied to the electrodes alters the state of polarization of the light and transmission through the second polarizer is thus accomplished. Consequently, a Kerr-cell system necessarily includes a high-voltage pulser, the duration of the transmitting period or exposure time being related to the duration of the applied voltage pulse.

A primary problem in any Kerr-cell system relates to the high-voltage pulser need therein for, in order to be effective, it must produce a pulse of very high voltage, usually in the order of 35 to 40 kilovolts. Accordingly, anyone familiar with this field and, therefore, with this problem, will immediately recognize the desirability, in terms of comparative safety, complexity of equipment, costs, etc., of finding some way to reduce this present high-voltage requirement. One way to do this is by increasing the Kerr constant of the abovesaid birefringent fluid used in such a system.

Nitrobenzene, $C_6H_5NO_2$, has long been used as the active substance or fluid in Kerr-cell work because nitrobenzene has thus far been found to have the highest Kerr constant. The present invention involves the discovery that certain organic compounds, specifically those containing nitro and nitrile groups, may be used as a Kerr-cell fluid and, when so used, that they have a considerably higher Kerr constant than nitrobenzene. Although these select organic compounds are not new per se, they have never before been used in Kerr cells nor are their properties such that they would appear to readily lend themselves to such use. Consequently, the discovery that these organic compounds can be so used and to very great advantage is an entirely unexpected result.

It is, therefore, an object of the present invention to reduce the high-voltage requirement of Kerr cells by using a fluid therein having a much higher Kerr constant than nitrobenzene.

The novel features of the invention, together with further objects and advantages thereof, will be better understood from the following description.

Kerr cells are in widespread use and a substantial amount of literature has already been published on the subject of Kerr cells. For example, an article entitled "An Electro-Optical Shutter for Photographic Purposes," authored by A. M. Zaren, F. R. Marshall and F. L. Poole and published in 1949 in volume 68 of the Transactions of the American Institute of Electrical Engineers, teaches the basic construction and operation of Kerr cells. Another article, entitled "Millimicrosecond Kerr Cell Camera Shutter," written by A. M. Zaren, F. R. Marshall and S. M. Hauser and published in volume 29 in the November 1958 issue of Review of Scientific Instruments, provides still further information with respect to Kerr cells. From the fact that Kerr cells are in the commercial market and also from the fact that the above and many other articles have been published on Kerr cells, it is seen that the Kerr cell apparatus is very well known by those skilled in this and in the related arts. Accordingly, it is not deemed necessary to illustrate a Kerr cell in an accompanying drawing.

Suffice it to say, therefore, that a Kerr cell shutter is composed of two flat plates or electrodes immersed in a fluid which becomes birefringent upon the application of an electric field thereto. The electric field is produced in response to the application of a voltage between the electrodes. When such a cell is oriented between two polarizers crossed for minimum transmission, the arrangement constitutes an optical shutter. With no voltage applied to the cell, light cannot be transmitted because of the crossed polarizers. However, a voltage applied to the electrodes produces the aforesaid birefringence which, in turn, has the effect of altering the state of polarization of the light passing through the fluid, thereby causing light to be transmitted through the second polarizer.

In the present invention, the fluid used in neither nitrobenzene nor any of the other compounds known to have been used in Kerr cells but, rather, is made up of selected organic compounds which, unexpectedly, have been found not only to exhibit the phenomenon of birefringence but which have been discovered to have Kerr constants approximately 75% greater than that of nitrobenzene. As previously indicated, the higher the Kerr constant, the smaller the voltage that need be applied.

More specifically, the organic compounds mentioned are those containing either a nitro or a nitrile group. Thus, if an organic compound of the type herein involved is represented as R—X, then the R may be either an alkyl, an aryl or a heterocyclic group, or any combination of these groups. The X, on the other hand, would be either of the aforesaid nitro or nitrile groups, or a combination of both. Examples of organic compounds that are encompassed by the present invention are 2,4-dinitrotoluene, meta-dinitrobenzene, meta-nitrotoluene, 4-biphenyl carbonitrile, cyanoguanidine, and the like.

It should be mentioned that the organic compounds mentioned above may either be entirely substituted for nitrobenzene or used in combination with it. In either case, the Kerr constant is materially increased, as noted above. It should also be mentioned that substances containing nitro and/or nitrile groups can be either liquid or solid in form and that either form may be used in the Kerr cell.

Having thus described the invention, what is claimed is:

1. A Kerr-cell shutter comprising: a pair of crossed polarizers; and a Kerr cell positioned between said polarizers, said Kerr cell including as its birefringent material an organic compound selected from the group consisting of organic compounds containing a nitrile group, organic compounds containing at least two nitro groups, and organic compounds containing a nitro group and a methyl group.

2. A Kerr-cell shutter comprising: a pair of crossed polarizers; and a Kerr cell positioned between said polarizers, said Kerr cell including as its birefringent material an organic compound selected from the group consisting of 2,4-dinitrotoluene, meta-dinitrobenzene, meta-nitrotoluene, 4-biphenyl carbonitrile, and cyanoguanidine.

3. A Kerr-cell shutter comprising: a pair of crossed polarizers; and a Kerr cell positioned between said polarizers, said Kerr cell including as its birefringent material an organic compound selected from the group consisting of organic compounds containing a nitrile group.

4. A Kerr-cell shutter comprising: a pair of crossed polarizers; and a Kerr cell positioned between said polarizers, said Kerr cell including 4-biphenyl carbonitrile as its birefringent material.

5. A Kerr-cell shutter comprising: a pair of crossed polarizers; and a Kerr cell positioned between said polarizers, said Kerr cell including cyanoguanidine as its birefringent material.

References Cited

Zarem et al.: A Multiple Kerr-Cell Camera, Rev. Sec. Inst., vol. 21, No. 6, June 1950, pages 514–519.

JEWELL H. PEDERSEN, *Primary Examiner.*

W. L. SIKES, *Assistant Examiner.*